United States Patent [19]

Patzschke

[11] 4,220,568

[45] Sep. 2, 1980

[54] POLYESTER CONTAINING CARBOXYL GROUPS, A PROCESS FOR PRODUCING THIS POLYESTER AND AQUEOUS COATING COMPOSITIONS CONTAINING THIS POLYESTER

[75] Inventor: Hans-Peter Patzschke, Wuppertal, Fed. Rep. of Germany

[73] Assignee: Herberts Gesellschaft mit beschrankter Haftung, Wuppertal, Fed. Rep. of Germany

[21] Appl. No.: 29,956

[22] Filed: Apr. 13, 1979

Related U.S. Application Data

[62] Division of Ser. No. 912,058, Jun. 2, 1978.

[30] Foreign Application Priority Data

Jun. 6, 1977 [AT] Austria .................................. 3983/77

[51] Int. Cl.$^2$ ........................ C08L 91/00; C08L 67/02
[52] U.S. Cl. ............................... 260/22 D; 260/22 R; 260/22 CQ; 528/288; 528/296; 528/302; 528/307
[58] Field of Search ............. 260/22 R, 22 CQ, 22 D; 528/288, 296, 302, 307

[56] References Cited

U.S. PATENT DOCUMENTS

| | | | |
|---|---|---|---|
| 3,158,584 | 11/1964 | Layman | 260/22 D |
| 3,481,891 | 12/1969 | Boylan et al. | 260/22 D |
| 3,893,959 | 7/1975 | Layman | 260/22 D |
| 4,026,850 | 5/1977 | Frank et al. | 260/22 D |
| 4,094,836 | 6/1978 | Yasui et al. | 260/22 CB |

*Primary Examiner*—Lucille M. Phynes
*Attorney, Agent, or Firm*—Schwartz, Jeffery, Schwaab, Mack, Blumenthal & Koch

[57] ABSTRACT

A carboxyl-group-containing polyester having an acid number of from 30 to 150, a hydroxyl number of from 20 to 150 and a Patton alkyd constant of from 0.9 to 1.2 which contain in co-condensed form
  (a) saturated alcohols selected from the group consisting of dihydric aliphatic, polyhydric aliphatic, dihydric cycloaliphatic, and polyhydric cycloaliphatic alcohols,
  (b) dicarboxylic acids selected from the group consisting of aliphatic, aromatic and cycloaliphatic dicarboxylic acids,
  (c) cyclic carboxylic acids selected from the group consisting of tribasic and polybasic cyclic carboxylic, characterized in that of the co-condensed compounds (c), which are only attached to the polyester through a carboxyl group, at least one other carboxyl group is condensed with a compound selected from the group consisting of aliphatic monoalcohols having from 3 to 20 carbon atoms, cycloaliphatic monoalcohols having from 3 to 20 carbon atoms and secondary amines containing from 6 to 36 carbon atoms, a process for its preparation, and an aqueous coating composition containing it.

42 Claims, No Drawings

POLYESTER CONTAINING CARBOXYL GROUPS, A PROCESS FOR PRODUCING THIS POLYESTER AND AQUEOUS COATING COMPOSITIONS CONTAINING THIS POLYESTER

This is a division of application Ser. No. 912,058, filed June 2, 1978.

This invention relates to a polyester containing carboxyl groups and having an acid number of from 30 to 150, a hydroxyl number of from 20 to 150 and a Patton's alkyd constant of from 0.9 to 1.2, to a process for producing said polyester and to aqueous coating compositions containing said polyester.

The use of synthetic resins which can be diluted with water is of considerable importance in the lacquer industry because the resulting reduction in the organic solvent content not only complies with pollution control requirements but also lessens the danger of fire and explosions. Thus, German Pat. No. 943,715 describes combinations of alkyd resins containing OH— and COOH—groups with low molecular weight hardenable phenol-aldehyde condensation products whose poor stability subsequently resulted in the use of phenol resol carboxylic acids (German Auslegeschrift No. 1,113,775, column 1, lines 26 to 36). According to German Auslegeschrift No. 1,242,779 (column 1, lines 20 to 24), poorer properties are obtained from a mixture of oil-free trimellitic acid polyester and aminoplastic resins or polyester and phenoplastic resin than from the pure polyesters without addition of crosslinking agents. The increased demands in stability due to use of the electrophoresis process led to attempts to increase the uniformity of material by precondensation between trimellitic acid resin and a crosslinking agent (German Ausleges-chrift No. 1,519,068, German Auslegeschrift No. 1,570,409). The alkyd resins used in this process are modified by unsaturated or saturated fatty acids. Air-drying water-soluble trimellitic acid alkyds are described in German Auslegeschrift No. 1,645,130 with the use of allyl ethers of polyalcohols having at least one non-etherified hydroxyl radical and up to 10% by weight of forerun fatty acids. Examination of the binders mentioned in the above-mentioned patents indicates surface disturbances and changes in the electrical behaviour during prolonged use in an electrophoresic beaker and these can be explained by the phenomena of oxidation and hydrolysis. Trimellitic acid alkyd resins having a small content of fatty alcohols are known from U.S. Pat. No. 3,511,797 and these are used for polish emulsions. A higher melting point of from 65° to 130° C., preferably from 80° to 110° is desired for achieving the polish effect. It is further achieved by means of a higher acid number of 105 to 250 and a smaller fatty alcohol content in relation to tricarboxylic acid. Alkyd constants of K=from 0.73 to 0.9 which are connected to the high acid number, and OH numbers of 3 to 90 may be calculated from the examples given. However, resins of this type are unsuitable for protection against corrosion. Although the high acid number gives rise to good water-solubility, the corrosion-protection action of such resins is extremely poor. In U.S. Pat. No. 3,053,783, glycols, tricarboxylic acids and monoalcohols are boiled together to form alkyd resins which are unsuitable as electrophoretically separable resins because, owing to the given molar ratios, they either become too low in molecular weight as a result of the too great excess of monoalcohol of else need to high an excess of alcohol so as to be synthesised without the risk of gelling.

It has now been found that resistance to ageing is seriously affected by hydrolysed fatty acids or polycarboxylic acids, such as phthalic acid, tetrahydrophthalic acid and trimellitric acid, which are attached to the chain structure in an extremely labile manner by their addition as semiesters, and which are soluble in water subsequent to hydrolysis. It has now surprisingly been found that these disadvantages can largely be obviated by using the polyesters of the present invention Accordingly, the present invention provides polyesters containing carboxyl groups and having an acid number of form 30 to 150, a hydroxyl number of from 20 to 150 and a Patton's alkyd constant of from 0.9 to 1.2, to a process for producing these polyesters and to aqueous coating compositions containing them.

Since all alkyd resins contain ester groups which are sensitive to hydrolysis, it was surprising to find that a stable, high-grade stoving lacquer can be obtained from a combination of polyester modified with monoalcohols, masked polyisocynanates and/or formaldehyde condensation resins as crosslinking agents and, optionally, modifying agents containing OH—groups, providing the individual components and the quantitative ratios are carefully selected and also providing a special production process is applied. By incorporating special dicarboxylic acids, it is possible to build up a chain structure which is more stable to hydrolysis, and to co-ordinate the suitable acid numbers and hydroxyl numbers with the required average molecular weights, molecular weights of from about 1000 to 8000, particularly from 3000 to 6000, being preferred for the polyester.

In principle, therefore, the polyester according to the present invention consists of the components used in accordance with the prior art. The quantitative ratios between the starting components are determined by the defined acid number, the hydroxyl number and the Patton's alkyd constant. The selection of the individual starting components with this objective in mind is known to any expert in this particular technical field.

The essence of the present invention, therefore, lies in the fact that, where more than dibasic aromatic carboxylic acids condensed with the polyester through only one carboxyl group are used, at least one of the free carboxyl groups and, preferably, at least one of said carboxyl groups in the ortho position to one of the other carboxyl groups to the acid, is partially esterified with an aliphatic and/or cycloaliphatic monoalcohol containing from 3 to 20, preferably from 6 to 18 and, most preferably from 8 to 13 carbon atoms.

The polyesters themselves preferably contain from 0.3 to 3.0 and, with particular preference, from 0.5 to 2.5 milliequivalents of aliphatic, aromatic and/or cycloaliphatic dicarboxylic acids condensed into them per gramme of resin. Of the tribasic or polybasic cyclic carboxylic acids, from 0.8 to 2.0, preferably from 0.9 to 1.8 and, most preferably from 1.1 to 1.5 millimoles per gramme of resin is attached to the polyester through only one carboxyl group.

The polyesters of the present invention are produced in known manner by reacting the starting materials. The following procedure carried out in stages may be used, and it is preferably adapted to avoid any clouding and gel formation:

1. The esterification of dicarboxylic acids, preferably aromatic and cycloaliphatic dicarboxylic acids, which are unable to form an intramolecular anhydride, with dialcohols, preferably dialcohols which contain either secondary OH—groups or primary OH—groups which are sterically hindered by β-substitution, a polyester containing OH—groups being formed through an excess of alcohol. The dicarboxylic acids used are for example isophthalic acid, terephthalic acid, 1,3-or 1,4-cyclohexane dicarboxylic acid and alkyl-substituted dicarboxylic acids, such as butyl isophthalic acid. Isophthalic acid is particularly preferred. In order to obtain chains with branches, part of the dicarboxylic acid may be condensed into the resin molecule through all the carboxyl groups by a corresponding quantity of a tricarboxylic acid, such as trimellitic acid. On the other hand, dimethyl esters, such as terephthalic acid dimethyl ester or 1,4-cyclohexane dimethyl ester, may also be introduced into the polyester by transesterification, optionally in the presence of transesterification catalysts.

The dialcohols used are, for example, neopentyl glycol, hydroxy pivalic acid neopentyl glycol ester, 2,5-hexane diol, 1,4-bis-(hydroxymethyl)-cyclohexane, 1,1-isopropylidene-bis-(p-phenoxy)-2-propanol, and 2,2,4-trimethyl-1,3-pentane diol. The glycidyl ester of α-branched fatty acids, such as versatic acid, may also be used as the dialcohol because the fatty acid is incorporated into the molecular structure in hydrolysis-resistant manner. In special cases, it is also possible to use epoxy resins having epoxy groups which have been reacted with unsaturated fatty acids or, preferably, with benzoic acid or corresponding monoalcohols. Polyols containing more than two OH—groups, such as trimethylol propane or pentaerythritol, may also be proportionately use for adjusting to suitable OH—numbers and visosities. The same criterion applied to a slight elasticising modification with long-chain dialchols, such as 1,6-hexane diol, or with aliphatic dicarboxylic acids, such as adipic acid and dimeric fatty acid. Esterification of this precondensate is carried out in known manner either azeotropically or in the melt at elevated temperatures (above 190° C. ) and gives a clear product having an acid number of from 0 to 50, preferably from 5 to 25, and a viscosity of from 200 to 3000 mPas (measured at 25° C. with a 75% solution in butyl glycol).

2. In order to ensure solubility in the aqueous alkali medium, carboxyl groups have additionally to be introduced into the OH—containing polyesters. This may be done by reaction at temperatures below 190° C. with an aromatic or cycloaliphatic dicarboxylic acid formed from a polycarboxylic acid containing more than 2 carboxyl groups, such as trimesic acid, hemimellitic acid, prehnitic acid, mellophanic acid, or benzene pentacarboxylic acid by defunctionalisation with a long-chain aliphatic hydrophobic monoalcohol and/or a secondary amine. The process is particularly easy to perform when anhydride-containing compounds, such as trimellitic acid anhydride, pyromellitic acid anhydride, the corresponding hydrogenated ring systems, cyclopentane tetracarboxylic acid anhydride or pyrazine tetracarboxylic acid anhydride, are used. The polycarboxylic acids are stoichiometrically reacted in a two-pot process with a quantity of monoalcohol and/or secondary amine so as to leave a dicarboxylic acid intact, which is then subsequently added to the OH—containing polyester at temperatures of from about 150° to 190° C.

In practice, good results have been obtained by producing suitable carboxyl-containing semiesters or semiamides in the presence of the OH—containing polyester in a one-pot process by adding substantially stoichiometric quantities of monoalcohol and/or secondary amine and trimellitic acid anhydride in the order. The monoalcohol used may be straight-chain or branched chain, saturated or unsaturated, primary, secondary, or tertiary, but is preferably a primary and/or secondary alcohol. It is also possible to use mixtures, particularly isomeric mixtures, of these above-mentioned alcohols. Aliphatic $C_6$ to $C_{18}$ monoalcohols and also benzyl alcohol and its alkyl substitution products are preferred. However, branched-chain $C_8$ to $C_{13}$ isomonoalcohols are particularly preferred. Semiesters which are particularly resistant to hydrolysis are obtained by using α-branched monoalcohols or secondary monoalcohols, such as cyclohexanol or secondary methyl octyl alcohol. The secondary amines used may be secondary amines cntaining from 6 to 36 carbon atoms, preferably from 8 to 24 carbon atoms such as, for example, di-(isobutyl)-amine, di-(2-ethylhexyl)-amine, or N-butyl-cyclohexyl amine.

The molar ratios used in the overall process are selected in such a way that a viscosity suitable for the particular application envisaged is obtained for the required acid number of from 30 to 150, preferably from 35 to 100 and, with particular preference, from 40 to 60. This viscosity amounts to from about 200 to 3000, preferably from 250 to 2000 mPas and, most preferably from 300 to 1500 mPas, as measured at 25° C. with a 50% solution in butyl glycol. The Patton's alkyd constant (K=total molar number divided by the number of acid equivalents) is in the range from about 0.9 to 1.2, preferably in the range of from 0.93 to 1.05 and, most preferably, in the range of from 0.94 to 1.0. In the final resin, the selected alcohol excess gives a hydroxyl number of from 20 to 150 and preferably of from 30 to 90. The structure of this resin ensures that the first cleavage products formed by hydrolysis (monoalcohol or trimellitic acid mono ester) are electrophoretically deposited with the film without causing any problems.

In the context of the invention, etherified formaldehyde crosslinking resins are aminoplasts, phenoplasts or (meth) acrylamide copolymers of which the methylol groups may be etherified with lower alcohols. The groups render the resins dispersible but not soluble in water, so that in general, dilution with water does not result in clear solutions. For EC-coatings, the production of suitable crosslinking resins should be carried out in the absence of foreign electrolytes, such as inorganic or organic salts, of the type used as catalysts or emulsifiers. Under the effect of heat, these react either with one another by condensation or by reaction with the reactive groups, such as OH— or COOH—groups, of the polyester which are still, of course, present in the resin. Known aminoplasts include etherified urea-formaldehyde condensation resins, melamine-formaldehyde condensation resins or benzoguanamine-formaldehyde condensation resins. Suitable examples ae the commercial products of the American Cyanamid Company, for example Cymel 300, Cymel 301, Cymel XM-1116 or Cymel XM 1125, or of the Monsanto Company, for example Resimene 745 or 735.

The copolymer may be produced from the following monomers:

10 to 50% by weight of N-methylol ethers of (meth)acrylamides, 0 to 20% by weight of α,β-unsaturated (meth)acrylic acid esters containing at least one hydroxyl group such as, for example, hydroxypropyl(meth)acrylate or 1,4-butane diol monoacrylate.

40 to 80% by weight of one or more unsaturated monomers which do not contain any further reactive groups, such as for example styrene, vinyl toluene or (meth)acrylic acid esters.

The solution polymerisation reaction is carried out at a solids content of from 70 to 90% by weight in the presence of radical initiators. The solvent used are either completely or partly miscible with water and, after neutralisation, enable further problem-free dilution with water. It is, however, preferred to use lower monoalkyl glycol ethers, such as ethyl glycol or butyl glycol. It is also possible to use alcohols, such as n-butanol, secondary butanol, or isopropanol, either on their own or together with an ether alcohol or diacetone alcohol.

N-methylol ethers may also be incorporated by the polymeranalogue reaction of copolymerised (mth)acrylamide with formaldehyde and monoalcohols, whilst OH—groups may also be incorporated by reacting copolymerised(meth)acrylic acid with monoepoxides. The individual components are generally selected for their resistance to hydrolysis and for the degree of hardness or softness which is to be obtained with the corresponding final product.

Suitable thermally reactive phenolic resins are standard commercial-grade aryl, alkyl or aryl-alkyl phenolic resins of the resol type which contain a considerable number of methylol groups of methylol ether groups.

The phenolic resins may have very low molecular weights, such as methylol phenol ether corresponding to the formula:

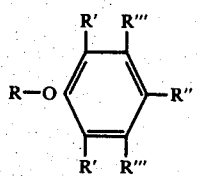

wherein
R=optionally halogenated, alkyl or alkenyl, (preferably chlorinated);
R'=H or —CH$_2$OH
R'''=H or alkyl, and
R''=—CH$_2$OH,

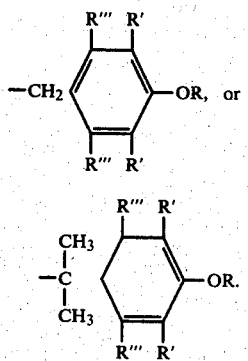

The alkyl or alkenyl groups in the above formula have from 1 to 6 and preferably from 1 to 4 carbon atoms. Phenolic resins may also be produced by condensing mononuclear and/or polynuclear phenols with formaldehyde or formaldehyde donors, such as paraformaldehyde. Resols of bisphenol A, optionally with the addition of small quantities of alkyl phenol, particularly when approximately 1 to 2 molecules of formaldehyde have been added per phenolic OH—groups, are particularly suitable. The methylol groups may be partially etherified with for example methanol, propanol, or butanol. It is also possible to use both water-insoluble and carboxyl-containing phenolic resins, although it is preferred to use water-insoluble phenol resols. The production of suitable phenolic resins is known in the art. The resin is dissolved in substantially non-hyrophilic solvents, such as methyl glycol, ethyl glycol, ispropanol or secondary butanol.

In cases where masked polyisocyanates are used as crosslinking agents in the present invention, they are emulsified into the base resin. The masked polyisocyanates should be stable in storage in the aqueous phase and, under the effect of heat, should crosslink with the reactive hydroxyl and/or carboxyl groups still present in the resin after elimination of the protective group. Masked polyisocyanates are obtained by reacting stoichiometric quantities of polyisocyanate and monofunctional compounds with active hydrogen. Suitable masking agents are phenols, cresol, lactams, oximes, acetoacetic esters, thiophenols, phthalimide, imidazole, acetylacetone, malonic esters, and alcohols. The masked isocyanate should not contain any free isocyanate groups. The reaction components and, optionally, any catalysts used are preferably mixed at temperatures of from about 50° to 80° C., optionally in the presence of inert solvents, the reaction temperature being prevented by cooling from exceeding about 100° to 120° C. In cases where protective groups which only separate at elevated temperatures and which are substantially involatile, such as higher alcohols, are used, these components largely remain behind in the film as plasticisers. Caprolactam, phenol or cresol and methyethyl ketoxime are preferably used as masking agents in the present invention.

Suitable polyisocyanates are any of those aromatic, aliphatic or cycloaliphatic polyisocyanates containing at least two isocyanate groups per molecule which are used and known in polyurethane chemistry. Typical examples are the isomers and isomer mixtures of phenylene diisocynate, tolylene diisocyanate, xylylene diisocyanate, naphthylene diisocyanate, 4,4'-dibenzyl diisocyanate, 4,4'-diphenyl methane diisocyanate, 4,4'-diphenyl methyl methane diisocyante, di- and tetraalkyl diphenyl methane diisocyanate and their hydrogenation products, such as 1-methyl-2,4-diisocyanatocyclohexane, cyclohexane-1,4-diisocyanate, and dicyclohexyl methane diisocyanate. Other examples are butane-1,4,diisocyanate, hexane-1,6-diisocyanate, 1,6-diisocyanato-2,2,4-trimethyl hexane and 1-isocyanatomethyl-3-isocyanato-1,5,5,-trimethyl cyclohexane. It is also possible to use triisocyanates, such as 1-methylbenzene-2,4,5 -triisocyanate, biphenyl-1,4,4'-triisocyanate and triphenyl methane triisocyanate, either on their own or in combination with the above-mentioned diisocyanates. It is further possible to use the relatively high molecular weight polyisocyanates obtained by dimerisation or trimersation, or NCO-adducts which are obtained by suitably reacting diisocyanates with water or low molecular weight glycols or polyols, such as ethylene glycol, propane diol, trimethylol propane, or glycerol, or relatively high molecular weight difunctional and higher-functional hydroxyl-containing polyethers, polyesters, polyamides, polyacetones, or butadiene oil diols, in the absence of moisture, and which still contain free isocyanate groups. For controlling the service properties, the number of isocyanate groups present may be reduced by reaction with saturated or unsaturated monoalcohols or corresponding secondary amines of different chain length.

The choice of the masking agent has to be made in such a way that the masked isocyanates formed are stable in aqueous solution at a substantially neutral to weakly basic pH-value and split back again at suitable stoving temperatures of from about 160° to 210° C. The stoving temperature can be lowered by adding suitable catalysts in a concentration of from about 0.1 to 2% by weight, based on the resin solids.

Organometallic compounds such as zinc octoate, dibutyl tin dilaurate, iron or zinc acetyl acetonate, may be used for this purpose. Between the NCO and OH—groups there exists such an equivalence ratio that approximately one free OH—group amounts to 0.1 to 1 masked isocyanate.

The coating composition according to the invention beneficially contains from 95 to 50, preferably at least about 60% by weight of polyester containing carboxyl groups and from 5 to 35% by weight of the crosslinking agents listed above as well as from 0 to 25% by weight of the modification agents containing OH groups described below.

In order to improve the service properties, it is occasionally necessary to precondense the reactive crosslinking resin with the carboxyl-containing polyester by the action of elevated temperatures. However, this preliminary reaction should not be continued to the point where the binder can no longer be dissolved to the required extent.

In order to improve the flow properties during stoving and also the flexibility and impact strength of the hardened coatings, a hydroxyl-group-containing long-chain modifying agent based on esterified polyglycidyl ethers and/or unsaturated or saturated polyesters and/or (meth)acrylate copolymers having an OH-number of from 50 to 650, preferably from 100 to 500, and an average molecular weight (Mn) of from 300 to 7000, preferably from 1000 to 5000, is added in a quantity of from 0 to 25% by weight and preferably in a quantity of from 5 to 20% by weight. The resins must have such a molecular weight range that they are no longer volatile during stoving, but produce an improvement in fluidity under the action of heat.

The production of suitable resins is known and is generally carried out by condensing the starting products azeotropically or in the melt, optionally in the presence of suitable catalysts. Esters of polyglycidyl ethers such as, for example, liquid epoxy resins are obtained by reaction with synthetic saturated or drying monofatty acids, such as isononanoic acid, coconut oil forerun fatty acid, soya oil fatty acid, tall oil fatty acid, linseed oil fatty acid, isomerised linseed oil fatty acid or synouric fatty acid, in such in quantity that all the epoxy groups are reacted whilst the OH-groups remain unesterified. In one particular embodiment, solid epoxy resins for example are reacted with hydroxy carboxylic acids, such as dimethylol propionic acid, lactic acid or hydroxy stearic acid, in the presence of triphenyl phosphine. In another embodiment, polyglycidyl ethers of bisphenol A are reacted with amino alcohols containing a secondary NH-group, for example diethanolamine, di-n-butanolamine, methyl ethanolamine, diisopropanolamine, N-cyclohexylethanolamine, diisopropanolamine or N-cyclohexylethanolamine. Complete esterification of the starting components ensures that the acid number of the resins is below 5 and preferably below 2 mg KOH/g of solids.

Suitable OH-group-containing polyesters are obtained by esterifying polyalcohols, monoalcohols, di- and tri-carboxylic acid (anhydrides), a Patton's alkyd constant of from 1.00 to 1.20 and preferably from 1.03 to 1.10 being dependent upon the quantitative ratios selected. It is preferred to use the same starting materials as in the case of the carboxyl-group-containing polyester, with the difference that, in order to obtain higher elasticity, long-chain aliphatic dicarboxylic acids, such as azelaic acid, sebacic acid or dimeric fatty acids, are used instead of the cyclic dicarboxylic acids. The acid number of these polyesters is below 25 and is preferably below 15 mg KOH/g.

By adding suitable OH-group-containing copolymers, it is possible to vary the properties in regard to coverage, hardness and elasticity or corrosion resistance in dependence upon the monomers selected. Examples of vinyl monomers containing aliphatic alcohol groups are hydroxylalkyl(meth) acrylic acid esters, such as hydroxyproplacrylate, butane diol monomethacrylate, 2,2-dihydroxypropyl methacrylate, diethylene glycol monomethacrylate, N-hydroxyalkyl(meth) acrylic acid amides, for example N-(2-hydroxyethyl)-methacrylamide, N,N-bis-(hydroxyethyl)acrylamide, N-2-hydroxy-1,1-bis-(hydroxymethyl)-ethyl methacrylamide, allyl alcohol or poly alcohol monoallyl ethers, for example trimethylol propane monoallyl ether or pentaerythritol monoallyl ether. In addition to the monomers containing OH—groups, (meth) acrylic acid esters, styrene, vinyl toluene, dialkyl maleates dialkyl fumarates, and acrylonitrile, may be used. The OH—groups may also be incorporated by reacting copolymers containing carboxyl groups with alkylene oxides, for example ethylene oxide, or propylene oxide. It is preferred to use copolymers containing primary OH-groups. Copolymerisation is carried out in the usual way by heating in organic solvents, such as secondary butanol, ethyl glycol or butyl glycol, in the presence of monomer-soluble radical initiators, such as tert.-butyl peroctoate, tert.-butyl hydroperoxide, cumene hydroperoxide, di-tert.-butyl peroxide or azo-bis-isobutyronitrile.

A water-dilutable coating composition is produced from the reaction products thus obtained in the usual way by neutralisation with bases and dilution with distilled or deionised water, optionally with the addition of more solvent. It is important to ensure that dilution to a lower solids content is carried out gradually so that insoluble coagulates or precipitation phenomena are avoided. The bases which may be used for neutralising the coating composition of the present invention are bases which are also used for this purpose in the prior art, for example ammonia, primary, secondary or tertiary alkylamines, such as diethylamine or triethylamine, morpholine, as well as alkanolamines such as diisopropanolamine, dimethylaminoethanol, and dimethylamino-2-methyl propanol, quaternary ammonium hydroxides and, optionally, even small quantities of alkylene polyamines, such as ethylene diamine or diethylene triamine. The choice of the neutralising agent influences the stability of the aqueous dispersion and has to be chosen accordingly. It is preferred to use volatile nitrogen containing bases, although non-volatile bases, such as lithium, sodium and potassium in the form of their hydroxides or carbonates may also be used as salt formers. The upper limit as to the quantity of amine added is determined by the complete neutralisation of all the carboxyl groups present. The lower limit is determined by the stability of the solution produced and by the dispersibility of the refill concentrate. The base is preferably used in a stoichiometric deficit, based on the carboxyl function of the reaction product, because if excessive quantities of amine are used the amine only has a solvent effect and this leads to surface faults. Experience has shown that the degree of neutralisation normally lies between 40 and 100%. The pH-value of the neutralised coating composition should preferably be in the range from about 6.5 to 9.0.

In order to promote the dilutability with water, and the levelling and handling of the concentrated resins, the coating compositions of the present invention may contain solvents which are added either during the actual polymerisation of the acrylic copolymer or else during the dissolution of the polyester or which are subsequently incorporated during the production of the lacquer. The upper limit for such an organic solvent lies at around 15% by weight and preferably at around 10% by weight, based on the weight of aqueous coating composition as a whole. For reasons of pollution control, it is desirable to use as little organic solvent as possible. Viscosity is reduced by using solvents having unlimited miscibility with water, such as methanol, isopropanol or the semiethers of glycols, such as ethylene glycol monobutyl ether or even keto alcohols, such as diacetone alcohol.

The acid concentrates having a solids content of from 85 to 60% by weight may be pigmented in the usual way in ball mills, three roll stands or sand mills and, after dilution to their processing consistency, may be processed by any standard coating techniques, such as spread coating, roll coating, spray coating, dip coating, or electro-coating. The binders may be pigmented with any of the usual pigments, fillers and lacquer auxiliaries providing they do not enter into any undesirable reactions with water, do not entrain any water-soluble foreign ions and do not precipitate on ageing. The pigment-binder ratio is dependent upon the viscosity of the binder and, in the case of electrode dip lacquering, is generally between 0.10:1 and 0.7:1. Where grinding is carried out in the presence of the crosslinking resins, an uncontrolled precondensation reaction can be initiated by the increase in temperature. Therefore, it is best to grind part of the polyester with pigments, fillers, or corrosion inhibitors, followed by cold mixing with the rest of the polyester, the OH-group-containing component and the crosslinking agent. The lacquers are particularly suitable for the electro-dip lacquering of metals and, for example after stoving for 10 minutes to 1 hour at 130° C. to 240° C., give hard, highly elastic films.

The films may be deposited at temperatures of up to about 35° C. under deposition voltages of from 100 to 400 volts for a dry film thickness of from 10 to 40 μm. The viscosity of the resin, the solids content, the solvent content, the deposition temperature, the time and the voltage are all seated in such a way that the required layer thickness is obtained on the plate after rinsing and stoving.

COMPARISON EXAMPLE 273 g of a coconut oil forerun fatty acid (acid number 375) and 615 g of neopentyl glycol are introduced into a 2 liter flask equipped with a stirrer and column and heated to 200° C. in an inert gas atmosphere so that the temperature at the head of the column does not exceed 102° C. When an acid number of 7.5 to 8 is reached, the mixture is cooled to 180° C., followed by addition of 72 g of adipic acid and 540 g of trimellitic acid anhydride. The mixture is then slowly heated to 180° C. and, after an acid number of approximately 55 has been reached, is diluted with butyl glycol and butanol (9:1) to a solids content of 80%.

Final values:
acid number: 53.2 mg KOH/g solid resin
viscosity: 1130 mPas, as measured at 25° C. after dilution to 50% with butyl glycol
solids content: 78.8% by weight, as measured by heating for 15 minutes to 185° C. in a recirculating air drying cabinet
Patton alkyd constant: K=0.98
OH number calculated: 87 mg KOH/g solid resin.

In order to test ageing, the bath is stirred for 4 to 8 weeks in the absence of any electrical load and zinc-phosphatised plates are periodically deposited. After about 4 weeks, the bath shows an increased tendency to boil, accompanied by cloud-like discoloration which is particularly noticeable in the case of light pigmentation. The surface shows irregular layer thicknesses and becomes rough.

PRODUCTION EXAMPLE A 654 g of neopentyl glycol and 136 g of trimethylol propane are melted in a 2 liter flask equipped with a stirrer and column. 271 g of isophthalic acid and 125 g of trimellitic acid anhydride are then added. This mixture is then heated in an inert gas atmosphere to a temperature of 210° C. at such a rate that the temperature at the head of the column does not exceed 102° C. When an acid number of 12 has been reached, the mixture is cooled to 150° C. A mixture of 536 g of isodecanol and 778 g of trimellitic acid anhydride is then added. The mixture is then heated to 180° C. and, after an acid number of around 50 has been reached, is diluted with butyl glycol to a solids content of around 80% by weight.

Patton alkyd constant: K=0.98
acid number: 47 mg KOH/g solid resin
OH-number calculated: 90 mg KOH/g solid resin
Viscosity: 661 mPas, as measured at 25° C. after dilution to 50% by weight with butyl glycol
Solid content: 81.9% by weight, as measured by heating for 15 minutes to 185° C. in a recirculating air drying cabinet.

PRODUCTION EXAMPLE B 670 g of neopentyl glycol and 367 g of dimerised fatty acid are melted in a four liter flask equipped with a stirrer and column. 219 g of isophthalic acid and 230 g of trimellitic acid anhydride are then added. The mixture is then heated in an inert gas atmosphere to a temperature of 210° C. at such a rate that the temperature at the head of the column does not exceed 102° C. When an acid number of 14 has been reached, the mixture is cooled to 150° C. 355 g of triisodecanol, 202 g of di(2-ethylhexyl) amine and 476 g of trimellitic acid anhydride are then added in quick succession. The mixture is heated to 180° C. and, after an acid number of around 45 has been reached, is diluted with butyl glycol and secondary butanol in a ratio of 1:4 to a solids content of around 75% by weight.

Patton alkyd constant: K=0.8 acid number: 43 mg KOH/g solid resin
hydroxyl number (calc.): 60 mg KOH/g solid resin
viscosity: 672 mPas, as measured at 25° C. after dilution to 50% by weight with butyl glycol
solids content: 72.4% by weight, as measured by heating for 15 minutes to 185° C. in a recirculating air drying cabinet.

PRODUCTION EXAMPLE C

Production process as in production Example A, but using the following quantities of starting materials:
570 g of neopentyl glycol
118 g of trimethylol propane
236 g of isophthalic acid
109 g of trimellitic acid anhydride.
These components are esterified up to an acid number of 15.
787 g of technical linoleyl alcohol having an iodine number of from 150 to 170 and
678 g of trimellitic acid anhydride
are then added. The mixture is heated to 180° C., and, after an acid number of around 45 has been reached, is diluted with butyl glycol and secondary butanol in a ratio of 1:4 to a solids content of around 75% by weight.
Patton alkyd constant: K=0.98
acid number: 44 mg KOH/g solid resin
hydroxyl number (calc.): 82 mg KOH/g solid resin
viscosity: 982 mPas, as measured at 25° C. after dilution to 50% by weight with butyl glycol
solids content: 71.8% by weight, as measured by heating for 40 minutes to 180° C. in a recirculating air drying cabinet.

PRODUCTION EXAMPLE D

OH—group-containing epikote ester 10 kg of technical xylene and 200 g of triphenyl phosphine are heated to 120°-130° C., followed by the gradual addition of 78.8 kg of a polyglycidyl ether based on bisphenol A having an epoxide equivalent weight of 925. After complete melting, 11.5 kg of dimethylol propionic acid are added. At temperatures of from 175° to 186° C., the water of reaction is azeotropically removed. The organic solvent is distilled off in vacuo, after which the mixture is cooled to around 130° C. It is then diluted with butyl glycol to a solids content of approximately 70% by weight.
Acid number: 7.3 mg KOH/g solid resin
viscosity: 1900 mPas, as measured at 25° C. after dilution to 50% by weight with butyl glycol
solids content: 71.6% by weight, as measured by heating for 40 minutes to 180° C. in a recirculating air drying cabinet.

PRODUCTION EXAMPLE E

OH—group-containing acrylate resin

A mixture of 636 g of n-butyl-acrylate, 344 g of hydroxyethylacrylate and 10 g of bis-isobutyronitrile is added dropwise over a period of 3 hours at around 100° C. to 667 g of secondary butanol, after which polymerisation is completed over a period of 4 hours with two additions of 3 ml of tertiary butyl peroctoate.
solids content: 59.2% by weight, as measured by heating for 40 minutes to 180° C. in a recirculating air drying cabinet.

PRODUCTION EXAMPLE F

Masked polyisocyanate 2778 g if biuret-containing trihexamethyl isocyanate (Desmodur N, a product of Bayer AG) are heated to 80° C., after which 2070 g of ε-caprolactam are added over a period of 3 hours at such a rate that the reaction temperature does not exceed 100° C. The mixture is then kept at this temperature until the NCO-number has fallen below 0.3%. Thereafter it is diluted with technical xylene to a solids content of 90% by weight.

PRODUCTION EXAMPLE G

Masked polyisocyanate 42.9 kg of isophorone diisocyanate are heated to 80° C. 37.8 kg of ε-caprolactam are then added over a period of 3 hours at such a rate that the reaction temperature does not exceed 100° C. The mixture is then kept at this temperature until the NCO-number has fallen below 0.1%. It is then diluted with butyl glycol to a solids content of 80% by weight.

EXAMPLE 1

195 g of the resin solution obtained in accordance with Production Example A are mixed with 40 g of Resimene 765 (a commercially available melamine resin) and the resulting mixture diluted to form a 10% aqueous solution with addition of 16 g of diisopropanolamine. For the results of deposition, see Table 1.

EXAMPLE 2

195 g of the resin solution obtained in accordance with Production Example A are mixed with 40 g of a low molecular weight methylol phenol ether resin and the resulting mixture is diluted with water to form a 10% aqueous solution with addition of 16 g of diisopropanolamine. For the results of deposition, see Table 1.

EXAMPLE 3

276 g of the carboxyl-group-containing polyester obtained in accordance with Production Example B are diluted with water to form a 10% aqueous solution with addition of 16 g of diisopropanolamine and 0.1 g of hydroquinone. For the results of deposition, see Table 1.

EXAMPLE 4

221 g of the carboxyl-group-containing polyester obtained in accordance with Production Example B are mixed with 26.7 g of a butanol-etherified phenol resol based on bisphenol A, in the form of a 75% solution in isopropanol, and 27.9 g of the OH—group-containing epikote ester obtained in accordance with Production Example D and the resulting mixture is diluted with water to form an approximately 10% aqueous solution with addition of 16 g of diisopropanolamine and 0.1 g of hydroquinone. For the results of deposition, see Table 1.

EXAMPLE 5

221 g of the carboxyl-group-containing polyester obtained in accordance with Production Example B are mixed with 20.4 g of a mixed-etherified hexamethylol melamine and 33.8 g of the OH-group-containing acrylate resin described in Production Example E and the resulting mixture is diluted with water to form a 10% aqueous solution with addition of 16 g of diisopropanolamine and 0.1 g of hydroquinone. For the results of deposition, see Table 1.

EXAMPLE 6

278 g of the carboxyl-group polyester described in Production Example C are diluted with water to form a 10% aqueous solution with addition of 16 g of diisopropanolamine. For the results of deposition, see Table 1.

EXAMPLE 7

223 g of the carboxyl-group-containing polyester produced in accordance with Production Example C are mixed with 26.7 g of a butanol-etherified phenol resol based on bisphenol A, in the form of a 75% solution in isopropanol, and 27.9 g of the OH—group-containing epikote ester described in Production Example D and the resulting mixture is diluted with water to form a 10% aqueous solution with addition of 16 g of diisopropanolamine. For the results of deposition, see Table 1.

EXAMPLE 8

221 g of the base resin according to Production Example B are mixed with 28 g of the OH-group-containing epikote ester described in Production Example D and 22.2 g of the masked polyisocyanate according to Production Example F. Following the addition of 16 g of diisopropanolamine, the mixture is slowly diluted with water to a solids content of around 10% by weight. For the results of deposition, see Table 1.

EXAMPLE 9

221 g of the base resin according to Production Example B are mixed with 33.8 g of the OH—group—containing acrylate resin described in Production Example E and 22.2 g of the masked polyisocyanate described in Production Example F. Following the addition of 16 g of diisopropanolamine, the mixture is slowly diluted with water to a solids content of around 10% by weight. The solution is then stirred for 24 hours. For the results of deposition, see Table 1.

EXAMPLE 10

237 g of the polyester obtained in accordance with Production Example C are mixed with 41.8 g of the masked polyisocyanate obtained in accordance with Production Example G. Following the addition of 16 g of diisopropanolamine, the mixture is slowly diluted with water to a solids content of around 10% by weight. Deposition is carried out after stirring for 24 hours. For the results of deposition, see Table 1.

Table 1

|  | Comparison test | Example 1 | Example 2 | Example 3 | Example 4 |
|---|---|---|---|---|---|
| pH-value | 7.4 | 7.1 | 7.3 | 8.2 | 8.6 |
| Conductivity | 830 μScm$^{-1}$ | 700 μScm$^{-1}$ | 850 μScm$^{-1}$ | 880 μScm$^{-1}$ | 800 μScm$^{-1}$ |
| MEQ-value | 58 | 60 | 60 | 55 | 54 |
| Deposition conditions | 2 mins./30° C. | 2 mins./30° C. | 2 mins./30° C. | 2 mins./30° C. | 2 mins./30° C. |
| Deposition voltage for 25 μm | 120 volts | 210 volts | 330 volts | 200 volts | 105 volts |
| Stoving temperature | 25 mins./175° | 25 mins./175° | 25 mins./175° | 25 mins./175° | 25 mins./175° |
| Pendulum hardness (DIN 53 157) | 165"/170" | 75"/80" | 133"/136" | 59"/71" | 98"/101" |
| Erichsen indentation (DIN 53 156) | 5 mm | 4.2 mm | 8.2 mm | 9.4 mm | 8.8 mm |
| Surface after ageing | not i.o. | smooth i.o. | smooth i.o. | smooth i.o. | smooth i.o. |
| Bending test | partially i.o. | i.o. | i.o. | i.o. | i.o. |
| Sedimentation tendency | i.o. | i.o. | i.o. | i.o. | i.o. |
| Salt spray test (DIN 50 021) | after 168 hours | after 240 hours on Bonder 125 | after 240 hours | after 168 hours | after 168 hours |
| Penetration as measured after cutting | 17–22 mm | 13–17 mm | 8–13 mm | 6–8 mm | 11–17 mm |

|  | Example 5 | Example 6 | Example 7 | Example 8 | Example 9 | Example 10 |
|---|---|---|---|---|---|---|
| pH-value | 8.3 | 7.9 | 7.8 | 8.5 | 8.5 | 8.0 |
| Conductivity | 835 μScm$^{-1}$ | 720 μScm$^{-1}$ | 720 μScm$^{-1}$ | 830 μScm$^{-1}$ | 740 μScm$^{-1}$ | 720 μScm$^{-1}$ |
| MEQ-value | 55 | 54 | 57 | 58 | 54 | 53 |
| Deposition conditions | 2 mins/30° C. | 2 mins/30° C. | 2 mins/30° C. | 2 mins/30° C. | 2 mins/30° C. | 2 mins/30° C. |
| Deposition voltage for 25μm | 220 volts | 90 volts | 130 volts | 200 volts | 140 volts | 100 volts |
| Stoving temperature | 25 mins/175° | 25 mins/175° | 25 mins/175° | 25 mins/175° | 25 mins/190° | 25 mins/175° |
| Pendulum hardness (DIN 53 157) | 85"/84" | 165"/185" | 196"/185" | 115"/120" | 76"/77" | 210"/195" |
| Erichsen indentation (DIN 53 156) | 6.9 mm | 8.2 mm | 9.0 mm | 9.3 mm | 9.9 mm | 8.1 mm |
| Surface after ageing | smooth i.o. | i.o. | smooth i.o. | smooth i.o. | smooth i.o. | smooth i.o. |
| Bending test | i.o. | i.o. | i.o. | i.o. | i.o. | i.o. |
| Sedimentation tendency | i.o. | i.o. | i.o. | i.o. | i.o. | i.o. |
| Salt spray test (DIN 50 021) |  |  | after 168 hours on Bonder 125 |  |  |  |
| Penetration as measured after cutting | 4–6 mm | 8–11 mm | 5–9 mm | 4.5–7 mm | 5.5–8 mm | 8.5–12 mm | i.o. = in order

We claim:
1. A carboxyl-group-containing polyester resin having an acid number of from 30 to 150, a hydroxyl number of from 20 to 150 and a Patton alkyd constant of from 0.9 to 1.2 which contains to co-condensed form:
   (a) Saturated alcohols selected from the group consisting of dihydric aliphatic, polyhydric aliphatic dihydric, cycloaliphatic and polyhydric cycloaliphatic alcohols,
   (b) dicarboxylic acids selected from the group consisting of aliphatic, aromatic and cycloaliphatic dicarboxylic acids,
   (c) cyclic carboxylic acids selected from the group consisting of tribasic and polybasic cyclic carboxylic acids, characterised in that of the co-condensed compounds (c), which are only attached to the polyester through a carboxyl group, at least one other carboxyl group is condensed with compound selected from the group consisting of aliphatic monoalcohols having from 3 to 20 carbon atoms, cycloaliphatic monoalcohols containing from 3 to 20 carbon atoms and secondary amines containing from 6 to 36 carbon atoms.

2. A polyester according to claim 1, characterised in that the co-condensed compounds (a) have sterically hindered alcohol groups selected from the group consisting of primary and secondary alcohol groups.

3. A polyester according to claim 1, characterised in that it contains from 0.3 to 3.0 milliequivalents of co-condensed compounds (b) per gramme of resin.

4. A polyester according to claim 1, characterised in that it contains from 0.5 to 2.5 milliequivalents of co-condensed compounds (b) per gramme of resin.

5. A polyester according to claim 1, characterised in that, of the co-condensed compounds (c) from 0.8 to 2.0 millimoles per gramme of resin are attached to the polyester through only one carboxyl group.

6. A polyester according to claim 1, characterised in that, of the co-condensed compounds (c), from 0.9 to 1.8 millimoles per gramme of resin are attached to the polyester through only one carboxyl group.

7. A polyester according to claim 1, characterised in that, of the co-condensed compounds (c), from 1.1 to 1.5 millimoles per gramme of resin are attached to the polyester through only one carboxyl group.

8. A polyester according to claim 1, characterised in that, the co-condensed compounds (b) are selected from the group consisting of aliphatic saturated dicarboxylic acids and dimerised unsaturated fatty acids and are present in a quantity of up to 20mole % based on the total sum of the molar numbers of all the carboxylic acids present.

9. A polyester according to claim 1, characterised in that, the co-condensed compounds (b) are selected from the group consisting of aliphatic saturated dicarboxylic acids and dimerised unsaturated fatty acids, and are present in a quantity of up to 10mole % based on the total sum of the molar numbers of all the carboxylic acids present.

10. A polyester according to claim 1, characterised in that, co-condensed compound (b) is adipic acid.

11. A polyester according to claim 1, characterised in that the co-condensed compounds (b) are selected from monocyclic dicarboxylic acids.

12. A polyester according to claim 1, characterised in that the co-condensed compounds (b) are selected from monocyclic carboxylic acids which do not form intramolecular anhydrides.

13. A polyester according to claim 1, characterised in that the co-condensed compounds (c) are selected from monocyclic carboxylic acids.

14. A polyester according to claim 1, characterised in that the co-condensed compounds (c) are selected from benzene carboxylic acids.

15. A polyester according to claim 1, characterised in that co-condensed compound (c) is trimellitic acid (anhydride).

16. A polyester according to claim 1, characterised in that it has an acid number of from 35 to 100.

17. A polyester according to claim 1, characterised in that it has an acid number of from 40 to 60.

18. A polyester according to claim 1, characterised in that it has a viscosity of from 200 to 3000 mPas, as measured on a 50% solution in butyl glycol at 25° C.

19. A polyester according to claim 1, characterised in that it has a viscosity of from 300 to 1500 mPas, as measured on a 50% solution in butyl glycol at 25° C.

20. A polyester according to claim 1, characterised in that it has a hydroxyl number of from 30 to 90.

21. A polyester as claimed in claim 1, characterised in that it has a Patton Alkyd constant of from 0.93 to 1.05.

22. A polyester according to claim 1, characterised in that is has a Patton Alkyd constant from 0.94 to 1.00.

23. A process for the production of carboxyl-group-containing polyester resins having an acid number of from 30 to 150, a hydroxyl number of from 20 to 150 and a Patton alkyd constant of from 0.9 to 1.2, by polycondensing:
  (a) saturated alcohols selected from the group consisting of dihydric aliphatic, polyhydric aliphatic dihydric cycloaliphatic and polyhydride cycloaliphatic alcohols,
  (b) dicarboxylic acids selected from the group consisting of aliphatic, aromatic and cycloaliphatic dicarboxylic acids.
  (c) cyclic carboxylic acids selected from the group consisting of tribasic and polybasic cyclic carboxylic acids, characterised in that, of 50 to 100 mole % of the cyclic carboxylic acids selected from the group consisting of tribasic and polybasic cyclic carboxylic acids, at least one carboxyl group, but not all the carboxyl groups of the same acid molecule are partially condensed with aliphatic compounds selected from the groups consisting of monoalcohols having from 3 to 20 carbon atoms, cycloaliphatic monoalcohols containing from 3 to 20 carbon atoms and secondary amines containing from 3 to 6 carbon atoms and reacted with the other starting products.

24. A process according to claim 23, characterised in that components (a) and (b) are initially reacted to form an OH—containing polyester which is then polycondensed with the other starting products.

25. A process according to claim 23, characterised in that the co-condensed compounds (a) have sterically hindered alcohol groups selected from the group consisting of primary and secondary alcohol groups.

26. A process according to claim 23, characterised in that from 0.3 to 3.0 milliequivalents of component (b) are co-condensed per gramme of resin.

27. A process according to claim 23, characterised in that from 0.5 to 2.5 milliequivalents of component (b) are co-condensed per gramme of resin.

28. A process according to claim 23, characterised in that, of the compounds (c), from 0.8 to 2.0 millimoles, per gramme of resin are attached to the polyester through only one carboxyl group.

29. A process according to claim 23, characterised in that, of the compounds (c), from 0.9 to 1.8 millimoles per gramme of resin are attached to the polyester through only one carboxyl group.

30. A process according to claim 23, characterised in that, of the compounds (c), from 1.2 to 1.5 millimoles per gramme of resin are attached to the polyester through only one carboxyl group.

31. A process according to claim 23, characterised in that, the compounds (b) are selected from the group consisting of aliphatic saturated dicarboxylic acids and dimersed unsaturated fatty acids and are used in a quantity of up to 20 mole % based on the total sum of the molar numbers of all the carboxylic acids.

32. A process according to claim 23, characterised in that, the compounds (b) are selected from the group consisting of aliphatic saturated dicarboxylic acids, and dimerised unsaturated fatty acids and are used in a quantity of up to 10 mole % based on the total sum of the molar numbers of all the carboxylic acids.

33. A process according to claim 23, characterised in that, component (b) is adipic acid.

34. A process according to claim 23, characterised in that, the compounds (b) are selected from the group consisting of monocyclic dicarboxylic acids which preferably do not form an intramolecular anhydride.

35. A process according to claim 23, characterised in that, the compound (c) used is trimellitic acid (anhydride).

36. A process according to claim 23, characterised in that, the polyester has an acid number of from 35 to 100.

37. A process according to claim 23, characterised in that, the polyester has a viscosity of from 40 to 60.

38. A process according to claim 23, characterised in that, the polyester has a viscosity of from 200 to 3000, as measured on a 50% solution in butyl glycol at 25° C.

39. A process according to claim 23, characterised in that, the polyester has a viscosity of from 300 to 1500 mPas as measured on a 50% solution in butyl glycol at 25° C.

40. A process according to claim 23, characterised in that, the polyester has a hydroxyl number of from 30 to 90.

41. A process according to claim 23, characterised in that the polyester has a Patton alkyd constant of from 0.93 to 1.05.

42. A process according to claim 23, characterised in that the polyester has a Patton alkyd constant of from 0.94 to 1.00.

* * * * *